US005125619A

United States Patent [19]

Collins

[11] Patent Number: 5,125,619

[45] Date of Patent: Jun. 30, 1992

[54] PIPE SUPPORTING ELEMENT FOR USE ON FORM BOARDS USED IN CONCRETE POURING OPERATIONS

[76] Inventor: Gary Collins, 10115 Aquilla Dr., Lakeside, Calif. 92040

[21] Appl. No.: 626,285

[22] Filed: Dec. 12, 1990

[51] Int. Cl.[5] ...................... B28B 23/00; E04G 17/00; F16L 3/08

[52] U.S. Cl. .................................. 249/219.1; 52/371; 248/65; 248/74.3; 249/93

[58] Field of Search ....................... 249/1, 91, 93, 148, 249/149, 177, 207, 219.1; 52/365, 367, 371, 699; 248/49, 65, 74.3; 269/904

[56] References Cited

U.S. PATENT DOCUMENTS

| | | | |
|---|---|---|---|
| 163,531 | 5/1975 | Roake | 248/65 |
| 1,882,555 | 10/1932 | Gray | 248/74.3 |
| 3,150,429 | 9/1964 | Shaffer | 249/91 |
| 3,163,909 | 1/1965 | Williams | 249/93 |
| 3,559,910 | 2/1971 | Babb | 248/74.3 |
| 3,960,356 | 6/1976 | Adams | 249/93 |
| 3,964,219 | 6/1976 | Hala | 249/93 |
| 4,852,831 | 8/1989 | Sandstrom | 248/58 |
| 4,877,216 | 10/1989 | Harbeke | 249/207 |
| 4,881,705 | 11/1989 | Kraus | 248/74.2 |
| 4,946,117 | 8/1990 | Liesegang | 248/65 |

FOREIGN PATENT DOCUMENTS

| | | | |
|---|---|---|---|
| 1177227 | 4/1959 | France | 248/65 |
| 2301074 | 9/1976 | France | 248/65 |
| 211303 | 2/1967 | Sweden | 249/93 |

*Primary Examiner*—Jay H. Woo
*Assistant Examiner*—James P. Mackey
*Attorney, Agent, or Firm*—Terry M. Gernstein

[57] ABSTRACT

A pipe supporting element is releasably mounted on a top rim of a form board used to contain and support concrete during a drying and set up stage of a concrete pouring operation. The pipe supporting element supports a pipe away from the form board so concrete can ompletely surround the pipe whereby the pipe will be completely embedded in the hardened concrete. The pipe support element is monolithic and includes a rectangular base attached to the form board by a fastener, such as a nail, and a C-shaped section which abuttingly engages the pipe. A strap, such as a wire, is wound around the pipe and around the nail to further attach the pipe to the pipe supporting element. The pipe supporting element can be removed from the form board for re-use.

2 Claims, 2 Drawing Sheets

PIPE SUPPORTING ELEMENT FOR USE ON FORM BOARDS USED IN CONCRETE POURING OPERATIONS

TECHNICAL FIELD OF THE INVENTION

The present invention relates to the general art of buildings and static structures, and to the particular field of forms and supports used during a concrete pouring operation.

BACKGROUND OF THE INVENTION

Many building structures, such as floors, ceilings, and the like, include a concrete slab having pipes embedded therein. These units are generally formed by building a wooden form, supporting the pipes in the form, and pouring the concrete into the form. Once the concrete is set, the form is removed.

Heretofore, it has been the practice in the art to either tie the pipes directly to a form board or nail small pieces of wood to the form board to support the pipes on that form board. This pipe supporting process creates at least one problem in that an element is generally interposed between some portion of the pipe and the concrete. Thus, after the concrete has set, there may be portions of the pipe which remain exposed.

While the art does include devices which support a pipe coupling perpendicular to a planar surface of a form board, the inventor is not aware of any pipe supporting element which can support a pipe parallel to that from board planar surface in a manner which permits the pipe to be totally embedded in the concrete supported by that form board planar surface.

Since building costs can be appreciable, it is also important that overall costs be kept as low as possible. One way to achieve this goal is to re-use various parts and elements as many times as possible. This goal applies to the elements use in setting concrete as well as to other parts of the building. However, the inventor is not aware of any pipe support elements that are easily used, and are amenable to easy and efficient reuse as well. Some such elements may be so difficult to re-use, that it is actually cheaper to simply discard the element after a single use, and use new elements each time. Not only is this wasteful of time and materials, it creates trash disposal problems as well.

Accordingly, there is a need for a support element which can support a pipe away from a surface of a form board in a manner such that concrete poured and supported by that form board will totally surround the pipe, yet will be economical to use and be re-use.

OBJECTS OF THE INVENTION

It is a main object of the present invention is to provide a support element which can support a pipe away from a surface of a form board.

It is another object of the present invention to provide a support element which can support a pipe away from a surface of a form board in a manner such that concrete poured and supported by that form board will totally surround the pipe.

It is another object of the present invention to provide a support element which can support a pipe away from a surface of a form board in a manner such that concrete poured and supported by that form board will totally surround the pipe, yet is re-usable.

SUMMARY OF THE INVENTION

These, and other, objects are achieved by a monolithic, one piece support element having a rectangular support section and a C-shaped pipe engaging section. A nail accommodating hole is defined through the support section and a fastener wire is used to tie a pipe to a nail extending through the nail hole and into the top rim surface of a form board.

The support element is mounted on the top rim surface of a form board and has the C-shaped portion thereof extending inwardly of the inner surface of the form board. A pipe is held against the C-shaped portion, and is thus held spaced from the inner surface of the form board. Concrete poured into the form adjacent to the form board will therefore completely surround the pipe. Once the concrete has set, the pipe will be completely embedded in that concrete.

BRIEF DESCRIPTION OF THE DRAWING FIGURES

DETAILED DESCRIPTION OF THE PREFERRED EMBODIMENT OF THE INVENTION

Figure 1:
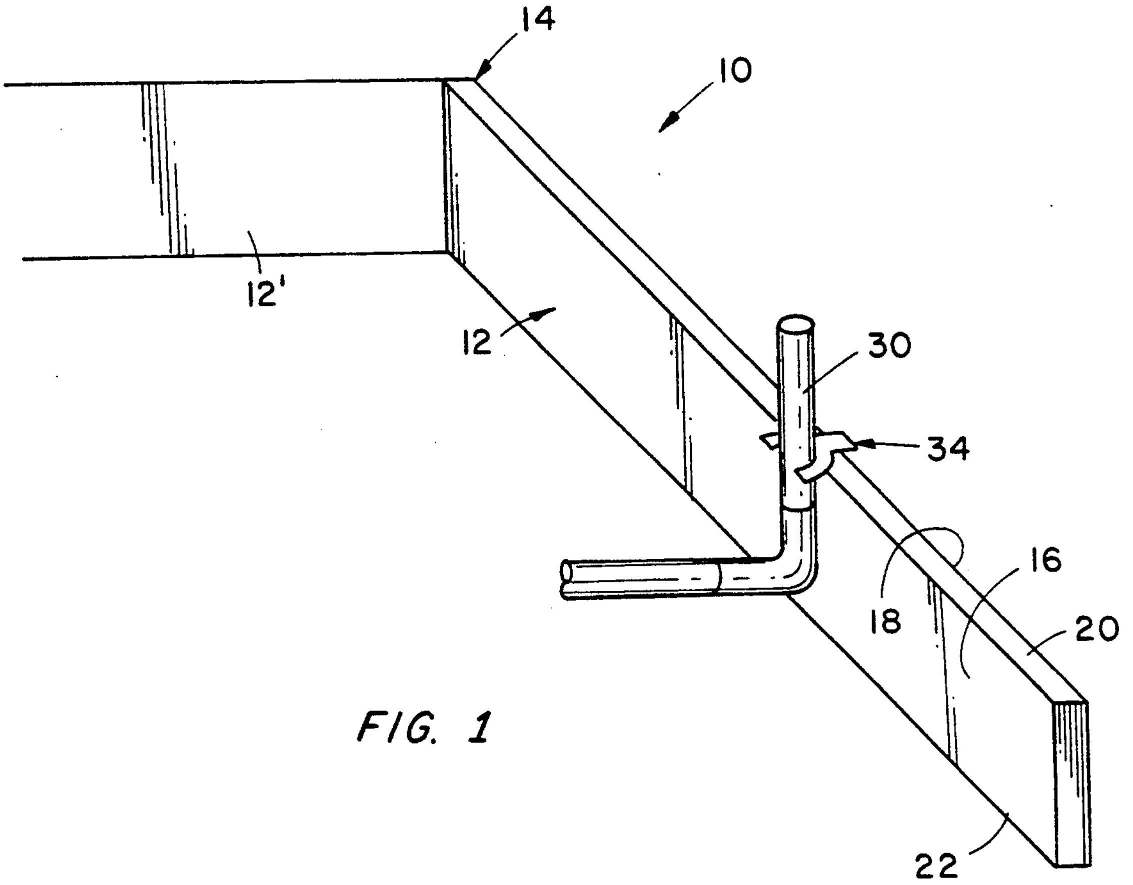
FIG. 1 is an inside perspective view of two sides of a form with a support element embodying the present invention mounted on a top rim of one of the form boards and holding a pipe away from that form board whereby concrete poured into the form to set will completely surround the pipe.

Shown in FIG. 1 is a portion of a form 10 used to support concrete during the hardening and setting of such concrete. Typically, such forms include a plurality of planar wooden form boards, such as form board 12 in abutting relationship with each other to form corners, such as corner 14 between form boards 12 and 12'. The form boards are oriented with respect to each other in the shape of the final product, and can be 2"×12" or like dimensions. In the set up condition, each form board includes a planar inner surface 16, a planar outer surface 18, a planar top rim 20 and a planar bottom 22.

Figure 2:
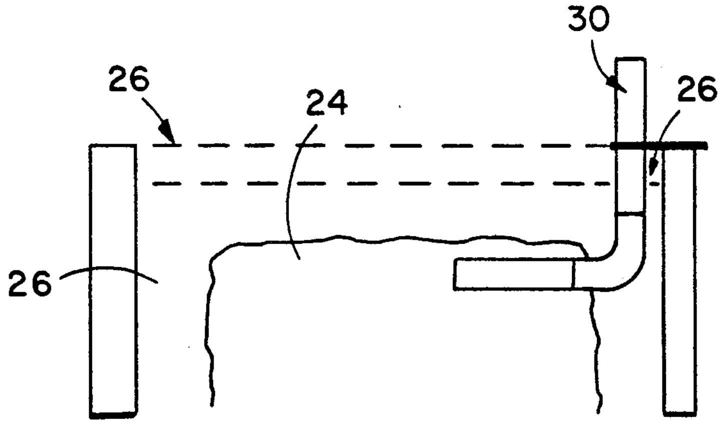
FIG. 2 is a cutaway end elevational view of the form and support element illustrating the pipe in the form.

As indicated in FIGS. 1 and 2, dirt 24 is located in the form, and concrete is poured into the form to define footings 26 or the like. Concrete is also poured into the form to define a concrete slab 26 as well. While a slab with footings is shown and described, it is to be understood that other building elements can be used without departing from the scope of the present disclosure, and no limitation is intended by the specific disclosure shown in FIGS. 1 and 2.

As shown in FIGS. 1 and 2, a pipe 30 is positioned within the form 10 and extends thereacross. This pipe will be embedded in the concrete slab when that slab is formed. As discussed above, it is important that the concrete completely surround the pipe 30 so that pipe will be completely embedded in the element. Therefore, it is important that the pipe be held away from the inner surface 16 of the form as that form holds and supports the concrete during set up.

The present invention is embodied in a pipe support element 34 that holds the pipe 30 away from the inner surface of the form board during concrete set up. The pipe support element is easily attached to the form board and securely holds the pipe in the desired location and orientation with respect to the form board. Once the concrete has set, the pipe support element can be removed from the pipe 30 and re-used.

Figure 3:
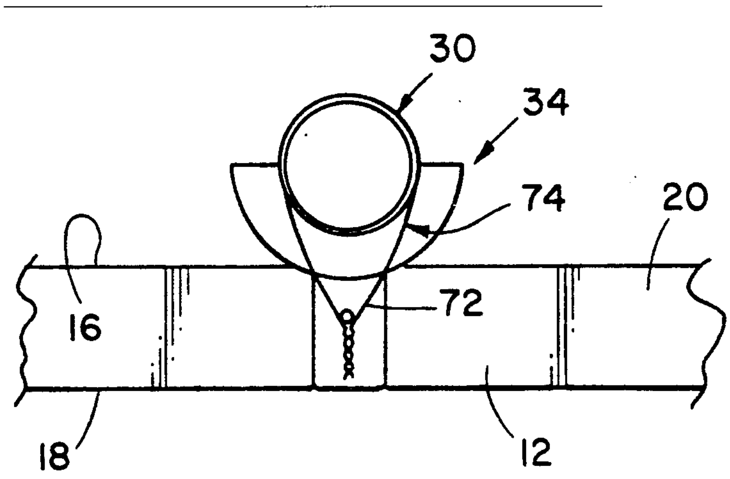
FIG. 3 is a top plan view of the support element mounted on top of a form board top rim.
Figure 4:
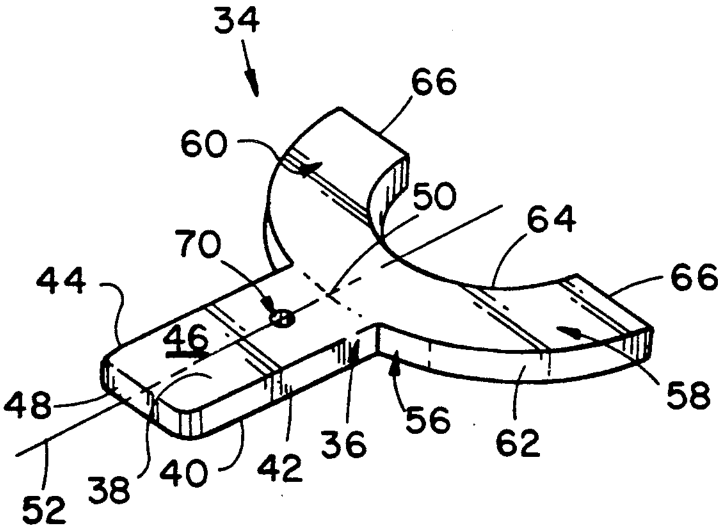
FIG. 4 is a perspective view of the pipe support element of the present invention.

The pipe support element is best shown in FIGS. 3 and 4. The pipe support element includes a monolithic body 36 having a front surface 38, a rear surface 40, and sides 42 and 44. The element includes a rectangular support section 46 having a bottom end 48 and a top section 50. The support section includes a longitudinal centerline 52 that extends between the bottom end 48 and the top section parallel to and intermediate to the sides 42 and 44.

A C-shaped top section 56 is located on the support section top section. The top section includes two legs 58 and 60 each of which includes an arcuate outer side surface, such as surface 62 of leg 58, and an inner arcuate surface 64 which is spaced from the outer side surface. Each leg includes a top surface 66, and the two top surfaces 66 are coplanar and collinear with each other. The two top surfaces are spaced from the support section 46 along the longitudinal centerline, and are parallel with the bottom end 48. The top section surfaces are coplanar with the support section surfaces so the overall outer surfaces of the pipe support element are planar.

A nail-receiving hole 70 is defined through the support element near the support section top section 50. The hole 70 is centered on the longitudinal centerline 70. A nail 72 is placed through the hole 70 to releasably attach the pipe support element 34 to the form board. The nail is removed, and the support element is easily removed from the form board for re-use.

A wire support strap 74 is wound around the nail and wrapped around the pipe to further support the pipe on the support element 34.

The use of the pipe support element is understood by referring to FIGS. 1, 2 and 3. Using a nail 72 through the nail hole 70, the element 34 is mounted on the top rim of a form board adjacent to a pipe to be embedded in a slab of concrete. The pipe is attached to the pipe support element by means of the wire support strap and the concrete is poured. After the concrete has set up, the form boards can be removed. The support strap 74 is removed from the pipe, and the form board atop which the support element is mounted is removed. This moves the pipe support element away from the pipe. The pipe support element can then be removed from the form board by simply removing the nail 72 from the form board and from the nail hole 70.

Because the pipe support element is re-usable, it can be manufactured of any suitable materials, including plastics-type materials, steel-type materials, and the like. The element 34 can be formed in any suitable size, and can be standardized if suitable.

It is understood that while certain forms of the present invention have been illustrated and described herein, it is not to be limited to the specific forms or arrangements of parts described and shown.

I claim:

1. A pipe support element for supporting a pipe on a form aboard used during a concrete pouring operation, the pipe support element consisting entirely of:

a monolithic, one-piece body having a planar front surface; a planar rear surface; a rectangular bottom support section having a bottom end, a top portion, sides, and a longitudinal centerline extending intermediate to the sides and from said bottom end to said top portion; a C-shaped top section having two identical legs, with each leg including an arcuate outer edge which intersects one of said bottom section sides adjacent to said bottom section top portion, an arcuate inner edge spaced from said arcuate outer edge, and two top edges intersecting said inner and outer arcuate edges, said top edges being co-planar with each other an collinear with each other and parallel with said bottom section bottom end; and a nail-accommodating hole defined through said bottom section from said rear and front surfaces;

a nail extending through said nail accommodating hole; and a fastening wire wrapped around said nail and around a pipe to be supported by the C-shaped section inner arcuate edge.

2. A pipe support element for supporting a pipe on a form board used during a concrete pouring operation, the pipe support element consisting entirely of:

a monolithic, one-piece body having a planar front surface; a planar rear surface; a rectangular bottom support section having a bottom end, a top portion, sides, and a longitudinal centerline extending intermediate to the sides and from said bottom end to said top portion; a C-shaped top section having two identical legs, with each leg including an arcuate outer edge which intersects one of said bottom section sides adjacent to said bottom section top portion, an arcuate inner edge spaced from said arcuate outer edge, and two top edges intersecting said inner and outer arcuate edges, said top edges being co-planar with each other and collinear with each other and parallel with said bottom section bottom end; and a nail-accommodating hole defined through said bottom section from said rear and front surfaces;

a nail extending through said nail accommodating-hole and releasably attaching said body to said form board with said C-shaped section positioned spaced from a form board inner surface; and a fastening wire wrapped around said nail and around a pipe in abutting contact with said C-shaped section inner arcuate edge.

* * * * *